No. 807,157. PATENTED DEC. 12, 1905.
M. E. DE GREE & D. C. McALISTER.
BELT GUIDE.
APPLICATION FILED JAN. 4, 1905.
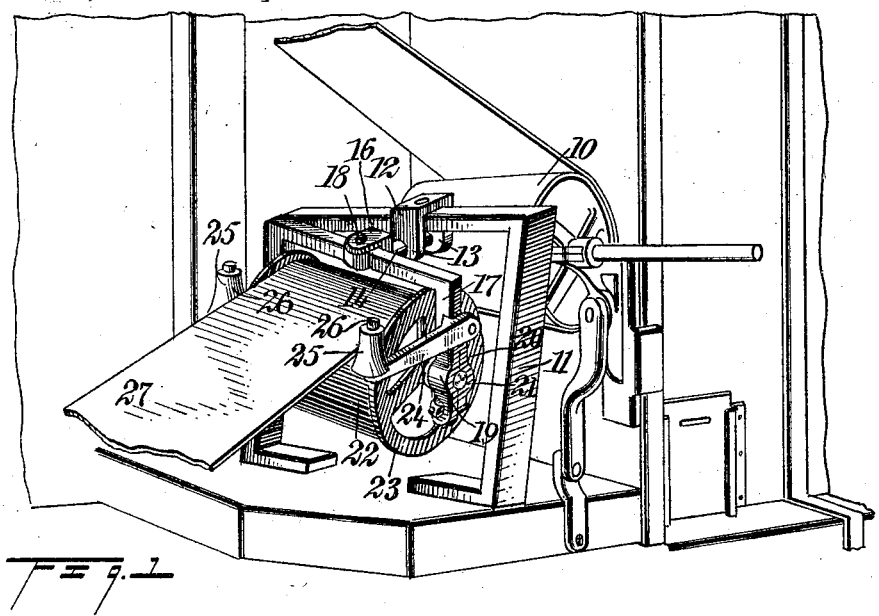
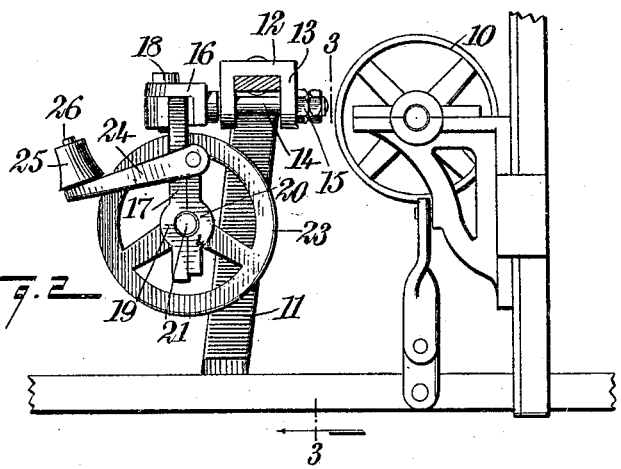
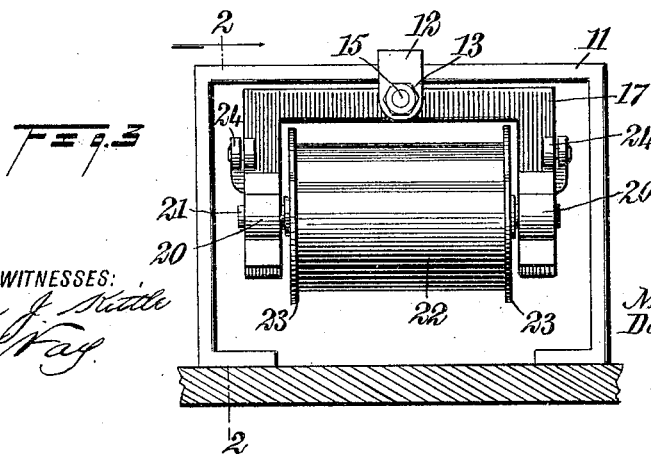
WITNESSES:
INVENTORS
Moses E. De Gree
Donald C. McAlister
BY
ATTORNEYS

UNITED STATES PATENT OFFICE.

MOSES EDWIN DE GREE AND DONALD CORMICK McALISTER, OF FLAXTON, NORTH DAKOTA.

BELT-GUIDE.

No. 807,157.  Specification of Letters Patent.  Patented Dec. 12, 1905.

Application filed January 4, 1905. Serial No. 239,552.

*To all whom it may concern:*

Be it known that we, MOSES EDWIN DE GREE and DONALD CORMICK McALISTER, citizens of the United States, and residents of Flaxton, in the county of Ward and State of North Dakota, have invented a new and Improved Belt-Guide, of which the following is a full, clear, and exact description.

Our invention relates to a guide for belts capable of general use, but especially applicable to threshing-machines.

The principal objects of the invention are to provide means for guiding a belt to or from a pulley, even when the two pulleys over which the belt passes are out of alinement, to provide means for preventing the belt from being thrown from the pulleys under any circumstances, and to guard against any cutting action upon the belt or any unnecessary wear thereof.

Further objects of the invention will appear in the course of the subjoined description.

Our invention will be described with especial reference to its application to a threshing-machine, where, as is well understood, under present conditions it is necessary to carefully set up the machine and driving-engine so as to be in perfect alinement. This requires time and careful adjustment on the field. With our invention they can be set up in approximate alinement and, in fact, may be from four to eight feet out of the way, and the belt itself will operate to move the guide in such a way as to prevent the belt from running off the cylinder-pulley and secure the working of the thresher under all conditions. This will also be accomplished without any injury to the belt and without the application of any appreciable increase of power.

Reference is to be had to the accompanying drawings, forming a part of this specification, in which similar characters of reference indicate corresponding parts in all the figures.

Figure 1 is a perspective view showing one form of our invention as applied to a threshing-machine. Fig. 2 is a sectional view thereof on the line 2 2 of Fig. 3, and Fig. 3 is a vertical sectional view on the line 3 3 of Fig. 2.

At the front of the cylinder-pulley 10 is located a stationary frame 11. Upon this frame is mounted a bracket 12. This bracket may either be fixedly secured to the frame or adjustable along it and has a pair of projections 13 extending downwardly upon opposite sides of the frame. These projections are provided with perforations, through which passes a stud 14. This stud is provided with one or more nuts 15 upon its inner end to secure it against longitudinal movement in the bracket, but is capable of turning upon its own axis in the perforations in the projections 13. The stud is provided with a head 16, to which is pivotally attached a movable frame 17. This pivoting action may be secured by a vertical rivet 18 or the like. The movable frame 17 is provided with bearings 19 and with a bracket 20 for securing a shaft 21 in the bearings. Upon this shaft is mounted a guide-pulley 22, having flanges 23 for keeping the belt on the pulley. A pair of arms 24 project forwardly from the frame 17 above the bearings and are provided upon their inner ends with rollers 25 upon upwardly-projecting extensions 26. These rollers are in such position as to engage the edges of the belt 27, which passes over the pulley 22, when the driver is offset from the cylinder-pulley 10 in such a manner as to cause the belt to move to one side of the pulley 22.

It will be readily observed that as the belt 27 passes over the pulley 22 to the cylinder-pulley 10 any offset on the part of the driving-pulley (not shown) will merely result in causing the belt to force the guide-pulley to such a position upon the pivots 14 and 18 as to accurately guide it to the pulley 10, the rollers 25 acting to assist in this operation when necessary. It will be seen that the frame 17 is entirely flexible so far as its motion is concerned with respect to the pulley 10 and that the shaft 21 can be moved by the belt to any necessary angle with respect to the axis of the cylinder-pulley.

It will be understood that the operation of the device is accomplished by the belt itself and that the blowing of the belt by wind will also be compensated for in the same manner, so that there will be no danger of the belt being dislodged from the cylinder-pulley under any ordinary conditions.

While we have illustrated and described one practical embodiment of our invention, it is to be understood that the invention is not limited to the form and details shown, as many changes could be made within the spirit of the invention.

Having thus described our invention, we claim as new and desire to secure by Letters Patent—

1. The combination of a pulley mounted on a horizontal axis, with a stationary frame mounted in front of said pulley, a bracket upon said frame provided with a pair of projections having perforations, a stud rotatably mounted in said perforations and provided with a head, a frame pivotally mounted in said head, a guide-pulley having flanges rotatably mounted on said last-mentioned frame, and a pair of arms on opposite sides of said last-mentioned frame, each being provided with an upwardly-projecting extension having a rotatable roller thereon; said rollers being located on opposite sides of the guide-pulley and at the front thereof.

2. The combination of a pulley mounted on a horizontal axis, with a stationary frame mounted in front of the pulley, a bracket upon said frame provided with projections having perforations, a stud rotatably mounted in said perforations and provided with a head, a frame pivotally mounted in said head, and a guide-pulley rotatably mounted on said last-mentioned frame.

3. The combination of a pulley mounted to rotate on an axis, with a stationary frame adjacent to the pulley, a stud mounted on said frame, a second frame pivotally mounted with respect to said stud on the side of the stationary frame opposite said pulley, and a guide-pulley rotatably mounted upon said second frame.

In testimony whereof we have signed our names to this specification in the presence of two subscribing witnesses.

MOSES EDWIN DE GREE.
DONALD CORMICK McALISTER.

Witnesses:
J. O. HOVLAND,
A. McALISTER.